July 5, 1960

J. S. VOYMAS ET AL 2,943,443

THRUST REVERSERS

Filed Nov. 21, 1956

INVENTORS
JAMES S. VOYMAS
ARTHUR J. AMBUTER
BY *Vernon F. Hauschild*
ATTORNEY

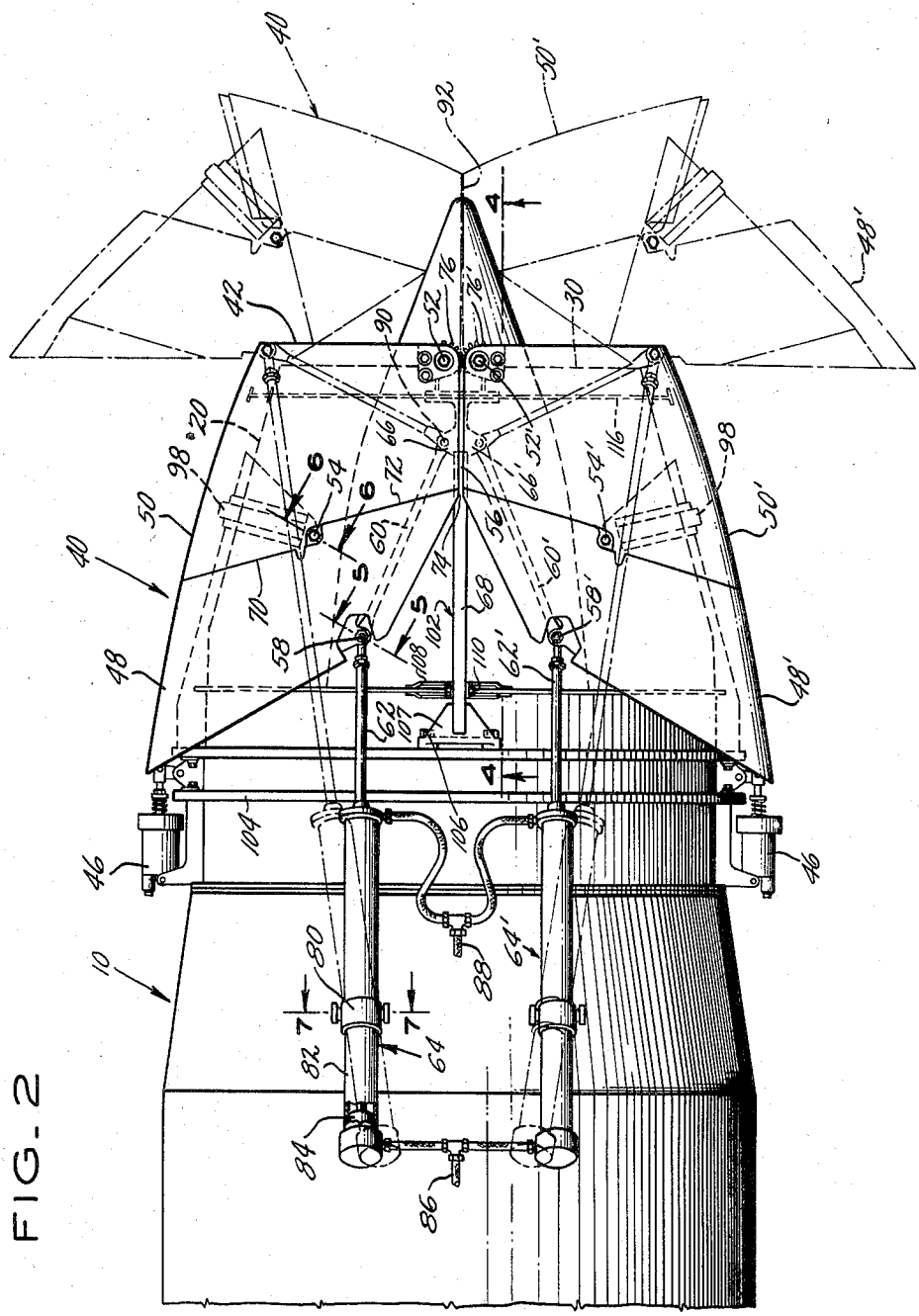

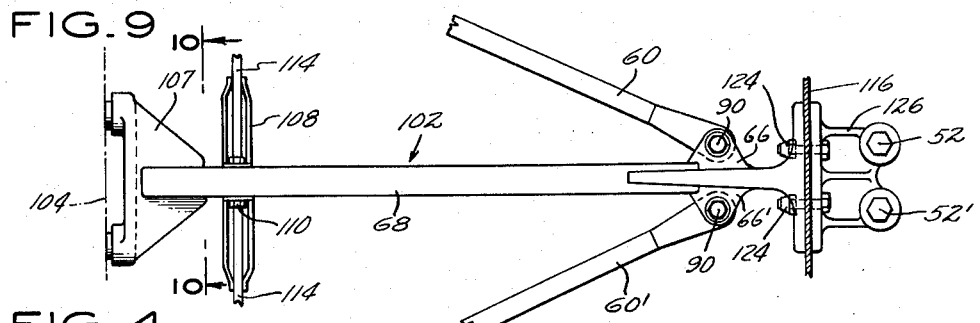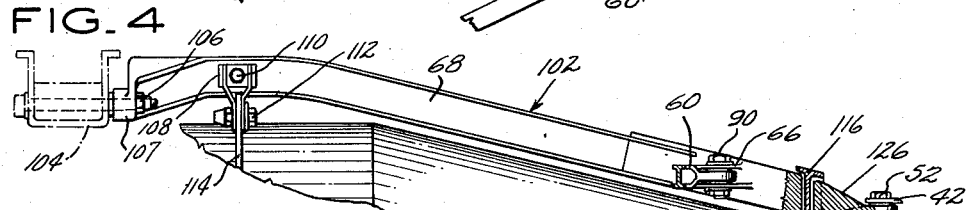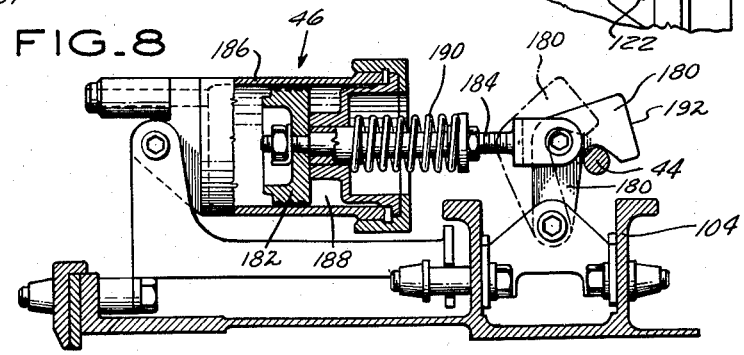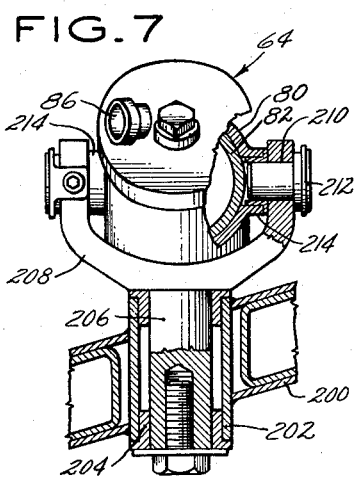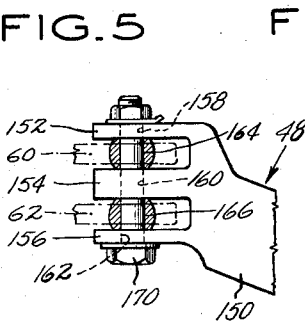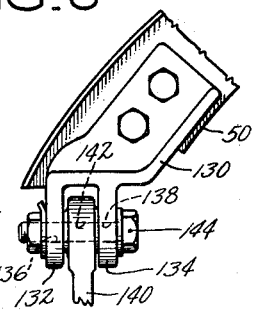

United States Patent Office 2,943,443
Patented July 5, 1960

2,943,443

THRUST REVERSERS

James S. Voymas, Natick, and Arthur J. Ambuter, Canton, Mass., assignors to United Aircraft Corporation, East Hartford, Conn., a corporation of Delaware Filed Nov. 21, 1956, Ser. No. 623,693

11 Claims. (Cl. 60—35.54)

This invention relates to thrust reversal and more particularly to the reversal of thrust as regards a mechanism such as a modern aircraft turbojet powerplant.

It is an object of this invention to provide a thrust reverser mechanism which is light in construction and simple, yet rugged and durable, in mechanical design.

It is a further object of this invention to provide a thrust reversal mechanism which consists of two two-piece half duct units located on each side of the discharge duct of the engine which units may be moved by a rotary or pivot motion as opposed to a translatory motion into either a thrust reverser position or a non-operative position.

It is a further object of this invention to provide a thrust reverser mechanism which, when in its nonoperative position, will blend smoothly with the airplane nacelle while forming a smooth duct concentric with and external of the engine discharge duct and positioned so as not to interfere with engine thrust and so as to have minimum drag effect.

It is still a further object of this invention to provide a thrust reverser unit which utilizes the principle of rotation or pivoting in moving to and from its thrust reverser position.

It is still a further object of this invention to provide a thrust reversal unit for use with mechanisms such as a modern aircraft turbojet engine which will effect thrust reversal during landing and maneuver operations but which may be locked in position during normal flight operations for safety purposes.

It is still a further object of this invention to provide a thrust reverser unit for use with mechanisms such as a modern aircraft turbojet engine which will cause the normal engine discharge to be rotated through substantial arcs on opposite sides of the engine by following the contours of a W-shaped thrust reverser unit to cause the exhaust to be discharged with a substantial vector in a direction opposite to the normal exhaust gas discharge direction yet in such a direction that neither engine nor aircraft parts will be damaged by the hot and powerful exhaust gases and, further, such that the discharged gases are not re-introduced to the engine compressor inlet.

It is still a further object of this invention to provide a thrust reverser unit which effects maximum thrust reversal without damaging engine or airplane parts by utilizing a multi-piece reverser unit comprising two thrust reverser flaps on each side of the engine center line which are capable of forming exhaust gas direction reversing passages such that the angle between the engine center line and the thrust reverser piece adjacent thereto is substantially the same as the angle between the two thrust reverser pieces on that side of the center of the engine center line.

It is a further object of this invention to provide a thrust reverser which performs the double function of blocking off the normal exhaust gas discharge route and smoothly causing the exhaust gases to be rotated through substantial arcs and such that substantially half of the discharge gas is discharged on opposite sides of the engine by following smooth concentric paths of substantially semi-circular cross-section formed by a thrust reverser of substantially W shape.

Other objects and advantages will be apparent from the specification and claims, and from the accompanying drawings which illustrate an embodiment of the invention.

In the drawing:

Fig. 2 is an enlarged plane view of an aircraft turbojet engine utilizing our thrust reverser shown in its nonoperative position in solid lines and in its operative position in phantom.

Fig. 4 is a view taken along line 4—4 of Fig. 2 to show the harness arrangement for supporting our thrust reverser unit.

Fig. 5 is a view taken along line 5—5 of Fig. 2 to show the connection joint between the front thrust reverser flap, the actuating cylinder and the rotatable link which is attached to the harness.

Fig. 6 is a view taken along line 6—6 of Fig. 2 to show the conection between the front thrust reverser flap and the rear thrust reverser flap.

Fig. 7 depicts universal attachment of the actuating cylinder-piston unit.

Fig. 8 is a cross-sectional showing of the in-flight lock mechanism.

Fig. 9 is a fragmentary top view of the construction shown in Fig. 4.

Fig. 10 is a view taken along line 10—10 of Fig. 9.

Figure 1:
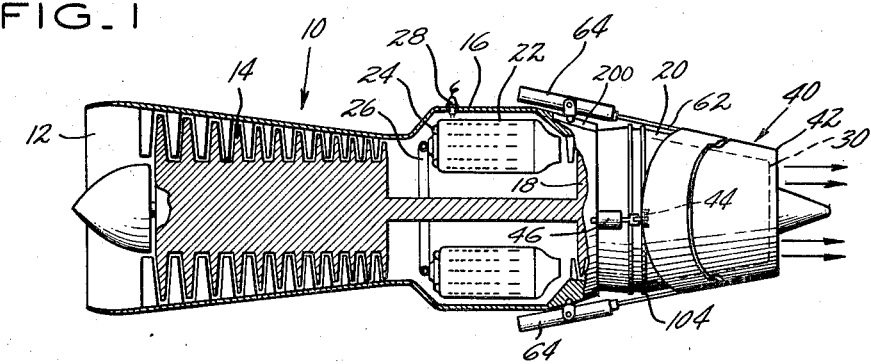
Fig. 1 is a cross-sectional view of a typical modern aircraft turbojet engine utilizing our thrust reverser.

Referring to Fig. 1, we see modern aircraft turbojet engine 10 which comprises air inlet section 12, compressor section 14, combustion section 16, turbine section 18, and exhaust section or duct 20. Air enters engine 10 through inlet section 12 and is compressed as it passes through compressor section 14. This compressed air is then heated in combustion section 16 due to the combustion which takes place in combustion chambers 22. Fuel is provided to combustion chambers 22 through fuel nozzles 24, which, in turn, receive fuel from fuel manifold 26. A fuel pump, not shown, and appropriate plumbing provide the engine fuel to fuel manifold 26. Spark plug or other ignition means 28 causes the atomized fuel which is projected into combustion chambers 22 by fuel nozzle 24 to ignite. This heated and compressed gas is then passed through turbine section 18 and is then passed through engine exhaust duct 20 and discharged through exhaust outlet 30. Thrust reverser unit 40 is shown in its retracted position in Fig. 1 in which it blends smoothly with the engine nacelle and forms a smooth duct external of and concentric with engine exhaust duct 20. Further, thrust reverser unit 40, as shown retracted in Fig. 1, forms a duct of substantially circular cross-section and culminates in circular structure 42 at its downstream end. As shown in Fig. 1 lug 44, which projects from thrust reverser unit 40, engages lock mechanism 46. Lock mechanism 46, shown in Fig. 8 and as described later, prevents thrust reverser unit 40 from pivoting into its operative or thrust reverser position at undesirable times and is connected such that the pilot must release the lock mechanism before the thrust reverser can be pivoted into its operable position.

Referring to Fig. 2, we see our thrust reverser unit 40 in its inoperative or retracted position in solid lines and in its operative or thrust reversing position in phantom. Considering the thrust reverser in its retracted position first, we see that the thrust reverser unit 40 consists of two sets of front flaps 48 and 48', each of which forms substantially a half or semiduct and are located on opposite sides of engine 10. In addition to the front flaps 48 and 48', thrust reverser unit 40 further consists of two rear flaps 50 and 50', each of which forms half or semi-duct units on opposite sides of powerplant 10 so that each corresponds in position with one of the front flaps 48 or 48'. The rear flaps 50 and 50' are pivotally attached to powerplant 10 at the four pivot points 52 and 52'. For purposes of description and since thrust reverser unit 40 is symmetric on each side of powerplant 10 on opposite sides of either a vertical or horizontal plane drawn through the powerplant centerline, we will designate the left side (plan view looking from engine inlet aft) units by reference numerals which correspond to their counter parts on the right side but will use a prime (') mark to designate the right side units. For purposes of this description, the left side units alone will be described, but it should be borne in mind that the corresponding right side units operate in a similar fashion.

Still referring to Fig. 2 and considering the left rear flap to be reference numeral 50, while the right rear flap is reference numeral 50', the right rear flap 50' attaches to powerplant 10 by means of the harness mechanism 102 (best shown in Fig. 9 and to be described later) at two pivot points 52' which are located substantially 180° apart at roughly the top and the bottom of powerplant 10. In similar fashion, left rear flap 50 is pivotally attached to powerplant 10 at two similar pivot points 52. Left rear flap 50, in addition to being pivotally attached to powerplant 10 at pivot points 52, is pivotally attached to the left front flap 48 at two corresponding pivot points 54 (see Fig. 6). Due to the pivotable attachment of rear flap 50 at pivot point 52, rear flap 50 can be moved in a pivotal motion only. In their retracted positions, the rear flaps 50 and 50' abut one another at surface 56. Front flap 48, in addition to being pivotally attached to rear flap 50, is also pivotally attached at two pivot points 58 both to restraining means 60 which is a rotatable link and actuating arm 62 which is actuated by universally pivotable cylinder piston unit 64. Pivotable link 60, in addition to being pivotally attached to front flap 48 and actuating arm 62, is pivotally attached at its opposite end to lug 66 which projects from and is carried by bracket 68. In its retracted position, front flap 48 either abuts or smoothly overlaps rear flap 50 along surfaces 70 and 72. Front flaps 48 and 48' abut one another at point or surface 74. Rear flaps 50 and 50' are connected through gear units 76 and 76' which intermesh and cause the two rear flaps 50 and 50' to actuate in unison. This, obviously, further causes the two forward flaps 48 and 48' to operate in unison. Gear units 76 and 76' perform the function of bringing about symmetric action between pivotal units 50 and 50', 48 and 48', 48 and 50, and 48' and 50'. Gears 76 and 76' perform the further function of insuring that the left side and right side flaps actuate even though one of the actuating units 64 or 64' may be inoperative. It will be noted that since rear flap 50 is pivotally attached to powerplant 10 and since forward flap 48 is pivotally attached to both rear flap 50 and pivotable link 60, thrust reverser unit 40 is actuated in a pure pivotal motion. Both rear flap 50 and forward flap 48 are actuated by piston-cylinder unit 64. Unit 64 is pivotable in a substantially universal manner since it is held in bracket 80 which pivotally engages the case of engine 10 and is further pivotable in trunnion fashion as best is shown in Fig. 7 and which will be described later. Actuating unit 64 consists of cylinder 82 and piston 84 which is located therein. Piston 84 has actuating arm 62 projecting therefrom, which actuating arm 62 pivotally engages front flap 48 at pivot point 58 (see Fig. 5). Piston 84 may be caused to move within cylinder 82 by introducing compressed air or some other type of motive fluid flexible tubing 86 which is located at one end of cylinder 82 or through flexible tubing 88 which is located at the opposite end of cylinder 82. The introduction of the motive fluid through flexible tube 88 will cause piston 84 to move to its farthest forward position, thereby retracting thrust reverser unit 40. Introducing the motive fluid through flexible lines 86 will cause piston 84 to move to its farthest downstream or aft position, thus causing thrust reverser unit 40 to move to its operative position as shown in phantom in Fig. 2. As piston 84 moves rearwardly within cylinder 82, actuating arm 62 is caused to extend and pivot thereby causing outer flap 48 to pivot about pivot point 90 of lug 66 at a radius described by pivotable link 60 until flap 48 reaches its thrust reverser position. The movement of front flap 48 causes the pivotal movement of rear flap 50 about pivot point 52 and rear flap 50 pivots about pivot point 52 until it abuts in sealing relation rear flap 50' in the thrust reverser position along surface 92. Thrust reverser unit 40 is best shown in its thrust reverser position in Fig. 3.

Figure 3:
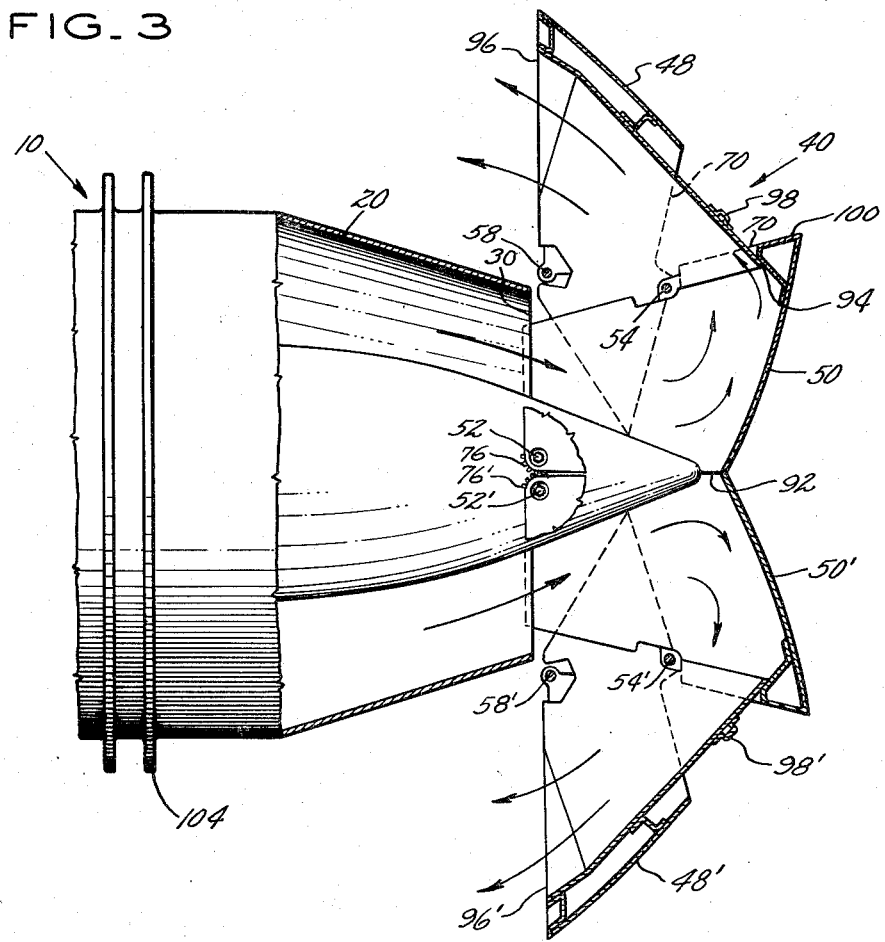
Fig. 3 is an enlarged plane view of our thrust reverser attached to an engine and shown in its thrust reversed position to demonstrate the exhaust gas discharge paths.

Referring to Fig. 3, we see that rear flaps 50 and 50' abut at surface 92 in sealing relation and that rear flap 50 abuts front flap 48 in sealing relation at surface 94 such that the front flaps 48 and 48' and rear flaps 50 and 50' form a thrust reverser of W-shape. In its operative position, thrust reverser unit 40 completely blocks off the normal discharge exhaust gas path and forms two symmetric paths or passages of substantially semi-circular cross-section, since flaps 48 and 50 are of substantially semi-circular cross-section, on opposite sides of engine 10. The exhaust gases must now flow, in substantially equal portions, due to the symmetry of thrust reverser unit 40 through one or the other of the smooth paths or passages formed by thrust reverser unit 40 and be discharged through outlet 96 or 96' in a direction substantially opposite to the normal exhaust gas discharge direction. Experience has shown that the most effective degree of arc through which the exhaust gas should be caused to rotate is roughly 135°. This gives a substantial thrust vector in a direction opposite to normal thrust so as to accomplish reverse thrust. Obviously, if the exhaust gases are discharged in a direction 90° to the normal thrust, thrust spoiling is accomplished and such might be sufficient in certain circumstances, however, if thrust reversal is required, the discharge gases must be caused to rotate through an arc of greater than 90°. If the discharge gases are rotated a complete 180° before being discharged, in addition to being likely to impinge and damage engine and aircraft parts, the hot exhaust gases will be re-introduced into the engine thereby elevating engine operating temperatures to a dangerous level. For this reason, although 180° reversal of exhaust gas discharge direction would probably accomplish optimum thrust reversal, such is not practical, and therefore, all factors being considered, roughly a 135° reversal or rotation is considered to be the most desirable.

Strengthening bracket 98 is provided to strengthen forward flap 48 and strengthening bracket 100 not only strengthens rear flap 50 but also serves to form sealing surface 94 between rear flap 50 and front flap 48. Strengthening rib or flange 100 performs the further function of providing an abutting or sealing surface along surface 70 between rear flap 50 and front flap 48 when these flaps are in their retracted positions.

Now referring to Fig. 4, we see the harness unit 102, which, while not necessarily so limited, consists of two brackets 68 located on the top and the bottom of engine 10. Since the bracket unit 102 is symmetrical above and below the engine centerline, the upper portion only is shown in Fig. 4 and will be described. Bracket 68 attaches to engine support flange 104 at its forward end by means such as nut and bolt unit 106. Bracket 68 receives additional support at its forward end from clip means 108. Attachment means such as nut and bolt arrangement 110 attaches clip means 108 to bracket 68 while attachment means such as nut and bolt unit 112 attach clip unit 108 to engine flange 114. Flange 114 performs the function of attaching exhaust duct 20 to the case of turbine section 18. To pass over flange 114, it is necessary that bracket 68 be bowed outwardly to some extent in the vicinity of flange 114. The force of the exhaust gases which pass through exhaust outlet 30 and impinge against thrust reverser unit 40 set up a tension load in brackets 68 as brackets 68 supports the thrust reverser 40 in position. When this tension load is sufficiently strong that it would tend to remove the bow from brackets 68 thereby changing the position of the thrust reverser 40 with respect to the powerplant 10. This would represent a serious mismatch and result in poor efficiency and/or destruction of either the thrust reverser unit 40 or the powerplant 10. Clips 108 perform the function of supporting the bowed portion of bracket 68 by attaching bracket 68 at its bowing point to engine flange 114, thereby accomplishing the function of supporting bracket 68 in its desired position and location. While not necessarily so limited, bracket 68 may be of I shaped cross-section and, at its after end, attaches to and supports support ring 116. Support ring 116, as shown, may be of I shaped cross-section and is attached to a tapered flange 118 which is shaped to engage but not attach to exhaust duct 20 of engine 10. Lugs 120 project from exhaust duct 20 and are straddled by lug units 122 which project from and are carried by support ring 116. The lug engagement just described serves to circumferentially fix support ring 116 and absorbs any load which would otherwise be imposed on a bracket 68 thru ring 116. Bracket 68 is attached to support ring 116 by attachment means such as nut and bolt unit 124 which also attaches bracket unit 126 to both support ring 116 and bracket 68. Ring 116 is a very important part of the support system for thrust reverser unit 40 as it transmits all of the load which it receives from bracket 68 into tailcone 20. Tailcone 20, because it is of cone-shape is specially suited to withstanding such loading. Further, there is enough play between ring 116, including tapered flange 118, and tailcone 20 that the necessary thermal differential expansion between these parts is permitted without crimping tailcone 20. Bracket unit 126 is so shaped as to receive securing means 128 which serves to pivotally attach rear flap 50 to harness unit 102 and, therefore, to powerplant 10 at a point in the vicinity of and a sufficient distance outboard of exhaust outlet 30 so that rear flaps 50 and 50' do not interfere with the discharge of the engine exhaust gases during normal engine operation.

Fig. 6 shows one of the four connections between rear flaps (50 and 50') and the front flaps (48 and 48'). While not necessarily so limited, a bracket 130 may be attached to rear flap 50 by any convenient means such as welding or mechanical attachment and carries two parallel projecting fingers 132 and 134 which have corresponding holes 136 and 138. Bracket 140 projects from flap 48 and has hole 142 therein which will be aligned to holes 136 and 138 of bracket 130 to receive attachment means 144, which may be in the form of a nut and bolt, such that the rear flaps (50 and 50') are pivotally attached to the forward or front flaps (48 and 48').

Fig. 5 illustrates one of the four connections between the front flaps (48 and 48') and links 60 and actuating rods 62. This is a three-way pivotal connection and, while not necessarily so limited, may consist of bracket 150 which projects from front flap 48 and has three parallel fingers 152, 154 and 156 projecting therefrom, each of which carries aligned holes 158, 160 and 162 therein, respectively. Link 60 has hole 164 in the end thereof which projects between fingers 152 and 154 and aligns with holes 158 and 160. Actuating rod 62 has hole 166 in the end thereof which projects between fingers 154 and 156 and aligns with holes 160 and 162. The alignments just mentioned, permit attachment means 170 to pass between said aligned series of holes thereby attaching pivotal link 60 and actuating rod 62 to front flap 48.

The in-flight locking arrangement 46, which serves the function of locking thrust reverser unit 40 in its retracted position during flight operation and at other times to prevent inadvertent thrust reverser actuation, is best shown in Fig. 8. Lug 44, which is attached to forward flaps 48 and 48' is shown to be in locked position with crank 180 (in solid lines) while crank 180 is shown, in its unlocked position, that is, the position of crank 180 which will permit thrust reverser actuation, in phantom. Crank 180 is attached to piston 182 through connecting rod 184. Piston 182 operates within cylinder 186. To release lug 44 and to thereby permit actuation of the thrust reverser, compressed air or some other pressurized fluid is introduced through appropriate plumbing into chamber 188 thereby overcoming the force of spring 190 and causing piston 182 to move to the left or forward with respect to powerplant 10 within cylinder 186. This serves to rotate crank 180 from its engaged position to its released position shown in phantom in Fig. 8. After the thrust reverse unit 40 goes into its thrust reverser position, the pilot, who can control the admission of compressed fluid into chamber 188, releases the compressed fluid from within 188 by venting the chamber through appropriate valving to atmosphere. The release of the pressure within chamber 188 permits spring 190 to return crank 180 to its forward position shown in solid lines in Fig. 8. When the thrust reverser is retracted to its nonoperaive position, lug 44, on forward flaps 48 and 48', strikes surface 192 of crank 180 thereby driving the crank to the left or forwardly with respect to powerplant 10 to compress spring 190 until lug 44 is rotated to a point sufficiently close to powerplant 10 that crank 180 can pass over lug 44 back to the position shown in solid lines in Fig. 8, thereby locking lug 44 and thrust reverser unit 40 in its retracted position. Lock mechanism 46 is pilot-actuated by any convenient plumbing and valving system so that the pilot has it within his power to prevent thrust reverser operation at inadvertent times.

As stated earlier, thrust reverser actuating cylinder-piston unit 64 is pivotable in two directions so as to accomplish a universal action. As shown in Fig. 1, each of the four actuating units 64 is attached to support web 200 which runs axially along powerplant 10 and may be mechanically attached to outwardly projecting circumferentially flanges on powerplant 10 at each of its ends.

In Fig. 7 we see that support web 200 carries cylindrical bearing support 202 and cylindrical bearing 204 therein. Cylindrical shank section 206 of yoke unit 208 is received within bearing 204 in pivotable engagement. Yoke 208 may be pivoted or rotated freely within bearing 204. Yoke 208 has corresponding holes 210 in its arm sections each of which receives cylindrical plug 212. Cylindrical boss 214 projects from opposite sides of actuating system support bracket 82 to engage cylindrical plugs 212 loosely so as to permit pivotal movement between yoke 208 and actuating cylinder-piston unit 64. In this fashion, the double pivotal or universal action for actuating means 64 is accomplished.

The thrust reverser unit as taught herein is capable of accomplishing a thrust reversing function which is roughly 65% efficient. This is due to the fact that the exhaust gases are caused to turn smoothly as it passes through the thrust reverser passages formed by flaps 50—48 and 50'—48'. This smooth turning of the exhaust gas and hence the high efficiency of the thrust reverser operation is brought about by causing the angle formed between engine center line and flap 50 to be obtuse while the angle formed by the engine center line and flap 48 is acute such that the angle formed by flap 50 and engine center line is substantially the same as the angle formed between flaps 48 and 50.

It is to be understood that the invention is not limited to the specific embodiment herein illustrated and described, but may be used in other ways without departure from its spirit as defined by the following claims.

We claim:

1. A discharge duct having an axis and an exhaust outlet through which exhaust gases are discharged, in combination with a thrust reverser unit which forms a smooth fairing surrounding and spaced from said duct when in its retracted position and which forms a W-shaped wall downstream of said exhaust outlet to smoothly divert and substantially reverse the flow of said exhaust gases when in its operating position, said thrust reverser unit comprising two similar pivotable units located on opposite sides of said duct, each of said pivotable units being of two-piece construction comprising a downstream piece which is pivotally attached to said exhaust outlet at a pair of first points and which forms the downstream portion of said fairing and which further culminates in a circular outlet substantially concentric with said exhaust outlet when said thrust reverser unit is in its retracted position and further comprising an upstream piece pivotally attached to said downstream piece at a pair of second points and which forms the upstream portion of said fairing when said thrust reverser unit is in its retracted position, actuating means pivotally attached to said upstream pieces at a pair of third points to cause said pivotable units to pivot outwardly and rearwardly about said exhaust outlet to form two oppositely directed abutting gas flow reversing gas passages downstream of said exhaust outlet with all of said first and third points in substantial radial alignment in a plane normal to said axis or to pivot forwardly and inwardly to their retracted positions.

2. A discharge duct having an exhaust outlet through which exhaust gases are discharged in combination with a thrust reverser unit having first moveable means comprising two half duct units each pivotally attached to said exhaust outlet and located on opposite sides of said discharge duct and so shaped that they form a smooth fairing outboard of said duct when in their retracted positions, said thrust reverser unit further having second movable means comprising two half duct units each pivotally attached to said first moveable means and located on opposite sides of said discharge duct forward of said first moveable means and so shaped that said first moveable means and said second moveable means form a smooth fairing outboard of said duct when in their retracted positions, restraining means pivotally connecting said second moveable means to said duct, actuating means pivotally attached to said second moveable means to cause said first and said second moveable means to move downstream by causing said second moveable means to pivot outwardly away from said duct and about said restraining means which second moveable means in turn causes said first moveable means to pivot about said exhaust outlet until the two half ducts of said first moveable means abut each other downstream of said exhaust outlet while the half ducts of said second moveable means each abut one of the half ducts of said first moveable means to form a gas passage of substantially semi-circular cross section and generating an arc of between 90° and 180° from the exhaust duct center line on each side of said exhaust duct.

3. A discharge duct having an exhaust outlet through which exhaust gases are discharged in combination with a thrust reverser unit having first moveable means comprising two half duct units each pivotally attached to said exhaust outlet and located on opposite sides of said discharge duct and so shaped that they form a smooth fairing outboard of said duct when in their retracted positions, said thrust reverser unit further having second moveable means comprising two half duct units each pivotally attached to said first moveable means and located on opposite sides of said discharge duct forward of said first moveable means and so shaped that said first moveable means and said second moveable means form a smooth fairing outboard of said duct when in their retracted positions, restraining means pivotally connecting said second moveable means to said duct, actuating means pivotally attached to said second moveable means to cause said first and second moveable means to move downstream by causing said second moveable means to pivot outwardly away from said duct and about said restraining means which second moveable means in turn causes said first moveable means to pivot about said exhaust outlet until the two half ducts of said first moveable means abut each other downstream of said exhaust outlet to form two exhaust gas deflection walls each of which forms an obtuse angle with the discharge duct centerline and is of substantially semi-circular cross section while the half ducts of said second moveable means each abut one of the half ducts of said first moveable means and form two exhaust gas deflection wall extensions of substantially semi-circular cross section located outboard of the deflection walls formed by said first moveable means and forming an acute angle with the discharge duct centerline such that said deflection walls formed by said first and said second moveable means form two abutting gas flow reversing gas passages which generate substantial arcs in excess of 90° on opposite sides of said discharge duct to cause the exhaust gases to be discharged in a direction to generate a thrust vector opposite in direction to normal gas discharge direction.

4. A powerplant having a discharge duct with an exhaust outlet through which powerplant gases are discharged rearwardly during normal powerplant operation, brackets attached to said powerplant and extending axially along the top and bottom of said discharge duct, a support ring concentric with and located substantially outboard of said exhaust outlet and connected to said brackets, means to restrain circumferential movement of said support ring, a thrust reverser unit comprising two pivotable units occupying laterally opposed positions on said discharge duct, each of said rotatable units being of two-piece construction and comprising a downstream section in the form of a half duct, the after end of which is pivotally attached to said support ring at two points substantially 180° apart and further comprising an upstream section in the form of a half duct which is pivotally attached at two points on its downstream edge to two points on the upstream edge of said downstream section, means attached to said upstream section to coact in sliding relationship with said downstream section when in their operable positions, linkage means pivotally connecting the forward edge of said upstream section to said brackets, pivotable actuating means pivotally attached to the upstream edge of each of said upstream sections either to cause each of said pivotable units to rotate either forwardly about said support ring and said linkage means to a retracted position in which the upstream and downstream sections of said pivotable units form a smooth fairing outboard of and in relative close proximity to and concentric with said discharge duct or to cause each of said pivotable units to rotate rearwardly about said support ring and said linkage means to form two oppositely directed abutting smooth gas passages downstream of said exhaust outlets generating a substantially uniform arc of between 90° and 180° with the centerline of said discharge duct centerline to cause the exhaust gases being discharged from said powerplant to be rotated and discharged in a direction to generate a thrust vector opposite in direction to the normal discharge direction, means to cause said pivotable units to pivot simultaneously, and means to lock said pivotable units when in their retracted positions.

5. A gas turbine powerplant comprising a compressor, a turbine, a combustion section connecting said compressor to said turbine, a discharge duct downstream of said turbine and having an exhaust outlet through which powerplant gases are discharged rearwardly during normal powerplant operation, brackets attached to said powerplant and extending axially along the top and bottom of said discharge duct, a support ring concentric with and located substantially outboard of said exhaust outlet and connected to said brackets, means to restrain circumferential movement of said support ring, a thrust reverser unit comprising two pivotable units located on opposite sides of said discharge duct, each of said pivotable units being of two-piece construction and comprising a downstream section in the form of a half duct the after end of which is pivotally attached to said support ring at two points substantially 180° apart and further comprising an upstream section in the form of a half duct which is pivotally attached at two points on its downstream edge to two points on the upstream edge of said downstream section, linkage means pivotally connecting the forward edge of said upstream section to said brackets, pivotable actuating means pivotally attached to the upstream edge of each of said upstream sections to cause each of said pivotable units to pivot either forwardly about said support ring and said linkage means to a retracted position in which said upstream and downstream sections of said pivotable units form a smooth fairing outboard of and in relative close proximity to and concentric with said discharge duct or to further cause each of said pivotable units to pivot rearwardly about said support ring and said linkage means to form two oppositely directed abutting smooth gas passages downstream of said exhaust outlets generating a substantially uniform arc of between 90° and 180° with said discharge duct centerline to cause the exhaust gases being discharged from said powerplant to be rotated and discharged in a direction to generate a thrust vector in a direction opposite to normal gas discharge direction, means to cause said pivotable units to pivot simultaneously, and means to lock said pivotable units when in their retracted positions.

6. A gas turbine powerplant having an outer case comprising a compressor, a turbine, a combustion section connecting said compressor to said turbine, said compressor, turbine and combustion section all contained within said outer case a discharge duct downstream of said turbine and having an exhaust outlet through which powerplant gases are discharged rearwardly during normal powerplant operation, a support flange projecting from said outer case brackets attached to said flange at their forward ends and extending axially along the top and bottom of said discharge duct, a support ring concentric with and located substantially outboard of said exhaust outlet and connected to the after end of said brackets, means to restrain circumferential movement of said support ring, second brackets immediately downstream of and attached to said support ring, a thrust reverser unit comprising two pivotable units located on opposite sides of said discharge duct, each of said pivotable units being of two-piece construction and comprising a downstream section in the form of a half duct the after end of which is pivotally attached to said second brackets at two points substantially 180° apart and further comprising an upstream section in the form of a half duct which is pivotally attached at two points on its downstream edge to two points on the upstream edge of said downstream section, linkage means pivotally connecting the forward edge of said upstream section to said brackets, pivotable actuating means pivotally attached to the upstream edge of each of said upstream sections to cause each of said pivotable units to pivot either forwardly about said support ring and said linkage means to a retracted position in which said upstream and downstream sections of said pivotable units form a smooth fairing outboard of and in relative close proximity to and concentric with said discharge duct or to further cause each of said pivotable units to pivot rearwardly about said support ring and said linkage means to form two oppositely directed abutting smooth gas passage downstream of said exhaust outlets generating a substantially uniform arc of between 90° and 180° with said discharge duct center line to cause the exhaust gases being discharged from said powerplant to be rotated and discharged in a direction to generate a thrust vector in a direction opposite to normal gas discharge direction, means to cause said pivotable units to pivot simultaneously, and means to lock said pivotable units when in their retracted positions.

7. A gas turbine powerplant having an outer case comprising a compressor, a turbine, a combustion section connecting said compressor to said turbine, said compressor, turbine and combustion section all contained within said outer case a discharge duct downstream of said turbine and having an exhaust outlet through which powerplant gases are discharged rearwardly during normal powerplant operation, a support flange projecting from said outer case brackets attached to said flange at their forward ends and extending axially along the top and bottom of said discharge duct, a support ring concentric with and located substantially outboard of said exhaust outlet and connected to the after end of said brackets, means to restrain circumferential movement of said support ring, second brackets immediately downstream of and attached to said support ring, a thrust reverser unit comprising two pivotable units located on opposite sides of said discharge duct, each of said pivotable units being of two-piece construction and comprising a downstream section in the form of a half duct the after end of which is pivotally attached to said second brackets at two points substantially 180° apart and further comprising an upstream section in the form of a half duct which is pivotally attached at two points on its downstream edge to two points on the upstream edge of said downstream section, linkage means pivotally connecting the forward edge of said upstream section to said brackets, pivotable universally moveable actuating means pivotally attached to the upstream edge of each of said upstream sections to cause each of said pivotable units to pivot either forwardly about said support ring and said linkage means to a retracted position in which said upstream and downstream sections of said pivotable units form a smooth fairing outboard of and in relative close proximity to and concentric with said discharge duct or to further cause each of said pivotable units to pivot rearwardly about said support ring and said linkage means to form two oppositely directed abutting smooth gas passages downstream of said exhaust outlets generating a substantially uniform arc of between 90° and 180° with said discharge duct center line to cause the exhaust gases being discharged from said powerplant to be rotated and discharged in a direction to generate a thrust vector in a direction opposite to normal gas discharge direction, means to cause said pivotable units to pivot simultaneously, and means to lock said pivotable units when in their retracted positions.

8. A gas turbine powerplant comprising a compressor, a turbine, a combustion section connecting said compressor to said turbine, a powerplant outercase enclosing said compressor, turbine and combustion section and having two axially spaced flanges projecting outwardly therefrom a discharge duct downstream of said turbine and having an exhaust outlet through which powerplant gases are discharged rearwardly during normal powerplant operation, a harness unit comprising elongated brackets extending axially along opposite sides of said discharge duct and attaching at its forward end to the farthest forward of said axially spaced flanges, support clip units attaching said elongated brackets to the other of said axially spaced flanges, a support ring attached to the after end of said elongated brackets which ring is concentric with and located immediately outboard of the after end of said discharge duct and having a tapered flange on its inner surface which is shaped to engage said discharge duct, second brackets on opposite sides of said discharge duct and located immediately downstream of and attached to said support ring and further located outboard of said exhaust outlet and each having two parallel holes extending substantially in a radial direction therethrough, means to restrain circumferential movement of said support ring, a thrust reverser unit comprising two pivotable units located on opposite sides of said discharge duct, each of said pivotable units being of two-piece construction and comprising a downstream section in the form of a half duct the after end of which is pivotally attached to said harness unit by pivotally attaching to one of said holes in two of said second brackets at points substantially 180° apart and further comprising an upstream section in the form of a half duct which is pivotally attached at two points on its downstream edge to two points on the upstream edge of said downstream section, linkage means pivotally connecting the forward edge of said upstream section to said brackets, actuating means which is pivotable in two planes pivotally attached to the upstream edge of each of said upstream sections either to cause each of said pivotable units to pivot either forwardly about said support ring and said linkage means to a retracted position in which the upstream and downstream sections of said pivotable units form a smooth fairing outboard of and in relative close proximity to and concentric with said discharge duct or to cause each of said pivotable units to pivot rearwardly about said support ring and said linkage means to form two oppositely directed abutting smooth gas passages downstream of said exhaust outlets generating a substantially uniform arc of between 90° and 180° with said discharge duct center line to cause the exhaust gases being discharged from said powerplant to be rotated and discharged in a direction to generate a thrust vector in a direction opposite to normal discharge direction, means to cause said pivotable units to pivot simultaneously, and means to lock said pivotable units when in their retracted positions.

9. Thrust reversal means for use with a discharge duct having an axis and comprising two units pivotally attached to and located on opposite sides of the discharge duct each having pivotally attached upstream and downstream half ducts, and actuating means pivotally attached to said upstream half ducts to pivot said units to a retracted position in which said upstream and downstream half duct units abut so that said half ducts form a smooth fairing outboard of the discharge duct with said upstream half ducts located upstream of said downstream half ducts and further to pivot said units to a thrust reverser position in which said upstream half ducts abut said downstream half ducts and are located radially outboard of said downstream half ducts so that said upstream and downstream half ducts of said units define equal obtuse angles therebetween and in which said downstream half ducts abut so that each forms an obtuse angle with said axis substantially equal to the obtuse angles formed between said upstream and downstream half ducts so that said units form two abutting exhaust gas passages of substantially semi-circular cross section with said gas passages located downstream of the discharge duct to cause all exhaust gases to be rotated through two substantial equal angles and be discharged in a direction to give a substantial thrust vector opposite to normal gas discharge direction, a pair of first means pivotally attaching said downstream half ducts to said discharge duct, and a pair of second means pivotally attaching said downstream half ducts to said upstream half ducts, a pair of third means pivotally attaching said actuating means to said upstream half ducts, said half ducts being so shaped that all of said first and third means are in substantial radial alignment in a plane normal to said axis when said units are in said thrust reverser position.

10. Thrust reversal means for use with a discharge duct having an axis and comprising two units pivotally attached to and located on opposite sides of the discharge duct each having pivotally attached upstream and downstream half ducts, and actuating means pivotally attached to said upstream half ducts to pivot said units to a retracted position in which said upstream and downstream half ducts abut so that said units form a smooth fairing outboard of the discharge duct with said upstream half ducts located upstream of said downstream half ducts and further to pivot said units to a thrust reverser position in which said upstream half ducts abut said downstream half ducts and are located radially outboard of said downstream half ducts so that said upstream and downstream half ducts of said units define equal obtuse angles therebetween and in which said downstream half ducts abut so that each forms an obtuse angle with said axis substantially equal to the obtuse angles formed between said upstream and downstream half ducts so that said units form two abutting exhaust gas passages of substantially semi-circular cross section with said gas passages located downstream of the discharge duct each of which passages present two substantially equal turning angles to cause all exhaust gases to be rotated through two substantial equal angles and be discharged in a direction substantially 135° away from the normal gas discharge direction, a pair of first means pivotally attaching said downstream half ducts to said discharge duct, and a pair of second means pivotally attaching said downstream half ducts to said upstream half ducts, a pair of third means pivotally attaching said actuating means to said upstream half ducts, said half ducts being so shaped that all of said first and third means are in substantial radial alignment in a plane normal to said axis when said units are in said thrust reverser position.

11. A discharge duct having an exhaust outlet through which exhaust gases are discharged in combination with a thrust reverser unit having first movable means comprising two half duct units each pivotally attached to said exhaust outlet and located on opposite sides of said discharge duct and so shaped that they form a smooth fairing outboard of said duct when in their retracted positions, said thrust reverser unit further having second moveable means comprising two half duct units each pivotally attached to said first moveable means and located on opposite sides of said discharge duct forward of said first moveable means and so shaped that said first moveable means and said second moveable means form a smooth fairing outboard of said duct when in their retracted positions, restraining means pivotally connecting said second moveable means to said duct, actuating means pivotally attached to said second moveable means to cause said first and said second moveable means to move downstream by causing said second moveable means to pivot outwardly away from said duct and about said restraining means which second moveable means in turn causes said first moveable means to pivot about said exhaust outlet until the two half ducts of said first moveable means abut each other downstream of said exhaust outlet to form two exhaust gas deflection walls each of which forms an obtuse angle with the discharge duct centerline and is of substantially semi-circular cross section while the half ducts of said second moveable means each abut one of the half ducts of said first moveable means and form two exhaust gas deflection wall extensions of substantially semi-circular cross section located outboard of the deflection walls formed by said first moveable means and forming an acute angle with the discharge duct centerline and further forming an obtuse angle with said first moveable means which is substantially equal to the obtuse angle formed between said first moveable means and said discharge duct centerline such that said deflection walls formed by said first and said second moveable means form two abutting gas flow reversing gas passages which generate substantial arcs in excess of 90° on opposite sides of said discharge duct to cause the exhaust gases to be discharged in a direction to generate a thrust vector opposite in direction to normal gas discharge direction.

References Cited in the file of this patent

UNITED STATES PATENTS

| | | |
|---|---|---|
| 2,715,312 | Brame | Aug. 16, 1955 |
| 2,735,264 | Jewett | Feb. 21, 1956 |
| 2,780,057 | Stavert | Feb. 5, 1957 |
| 2,839,891 | Drakeley | June 24, 1958 |
| 2,876,619 | Johnstone | Mar. 10, 1959 |

FOREIGN PATENTS

| | | |
|---|---|---|
| 754,808 | Great Britain | Aug. 15, 1956 |